United States Patent [19]

Saito et al.

[11] Patent Number: 5,057,364

[45] Date of Patent: Oct. 15, 1991

[54] MAGNETIC RECORDING MEDIUM

[75] Inventors: Shinji Saito; Hiroshi Ogawa, both of Kanagawa, Japan

[73] Assignee: Fuji Photo Film Co., Ltd., Kanagawa, Japan

[21] Appl. No.: 549,026

[22] Filed: Jul. 6, 1990

[30] Foreign Application Priority Data

Jul. 6, 1989 [JP] Japan .................................. 1-175178

[51] Int. Cl.$^5$ ............................................. G11B 23/00
[52] U.S. Cl. .................................... 428/323; 428/329; 428/694; 428/900
[58] Field of Search ................ 428/329, 323, 694, 900

[56] References Cited

U.S. PATENT DOCUMENTS

| | | | |
|---|---|---|---|
| 4,643,941 | 2/1987 | Miyoshi et al. | 428/900 |
| 4,670,337 | 6/1987 | Tokuoka et al. | 428/900 |
| 4,743,500 | 5/1988 | Miyoshi et al. | 428/900 |
| 4,837,083 | 6/1989 | Kuroda et al. | 428/900 |
| 4,965,125 | 10/1990 | Masaki et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a non-magnetic support having thereon at least one magnetic layer is disclosed, comprising a dispersion of ferromagnetic particles in a binder; said at least one magnetic layer comprising:

(a) a surface comprising abrasive agents having a Mohs' hardness of 6 or more in an average amount of 0.3 to 1.4 particles/$\mu m^2$, and (b) a cutting cross section containing abrasive agents having a Mohs' hardness of 6 or more in an average amount of at least 0.1 particle/$\mu m^2$ greater than said average amount of abrasive agents contained on said surface.

3 Claims, No Drawings

MAGNETIC RECORDING MEDIUM

FIELD OF THE INVENTION

The present invention relates to a magnetic recording medium having an excellent electromagnetic property and running durability.

BACKGROUND OF THE INVENTION

Magnetic recording media such as magnetic tapes and magnetic disks are now widely used as audio tapes, video tapes, computer tapes, floppy disks and the like, and intensive studies have been conducted to increase the density of the media. In the magnetic recording system, recording and reproducing are carried out by means of a magnetic head. In order to increase the density of the magnetic recording medium, therefore, there are required not only means for improving magnetic characteristics and homogenizing the distribution of a ferromagnetic powder in a magnetic layer, but also means for minimizing the spacing loss produced between the magnetic recording medium and the magnetic head.

For this reason, efforts have been made to make the surface of the magnetic layer as smooth as possible to minimize the spacing loss between the magnetic tape and the magnetic head.

However, as the magnetic surface is finished to a mirror surface and the magnetic tape comes into close contact with the magnetic head, the problem of the strength of the magnetic layer is encountered, namely the exfoliation of the magnetic layer caused by the contact with the magnetic head, the adhesion of the exfoliated magnetic layer to a surface of the magnetic head and the clogging of the magnetic head. On this account, previously abrasive agents about 1 $\mu$m in average particle size have been added to the magnetic layer in small amounts to reinforce the magnetic layer.

The particles used as the abrasive agents include $Al_2O_3$, $Cr_2O_3$, SiC and $\alpha$-$Fe_2O_3$, and have been added to the surface of the magnetic layer distributed as sparsely as possible, in order to prevent reduced electromagnetic property and to reduce the abrasion of the magnetic head. However, when the increase in density of the magnetic recording medium is further pursued by finely dividing the ferromagnetic powder, increasing coercive force, smoothing the surface of the magnetic layer, and so on, it has become clear that the above-described method is insufficient with respect to the strength of the magnetic tape and the maintenance of the magnetic head under optimum conditions. Then, JP-A-61-57036 (the term "JP-A" as used herein means an "unexamined published Japanese patent application") proposes the distribution of abrasive agents exposed on the surface of the magnetic layer, namely the average number of the abrasive agents per unit area of the magnetic layer, to 0.25 particles/$\mu m^2$ or more, in high density recording using a recording wavelength of about 1 $\mu$m or less, whereby the abrasive characteristics of the magnetic recording medium are improved and the problems of seizing, discoloration and clogging on the surface of the magnetic head formed of a metal such as Sendust are solved by cleaning due to this improvement. It is possible to improve such properties by this method, but the improvement in reduced audio output due to the damage of the magnetic tape edges caused by the repetition of running is still insufficient.

SUMMARY OF THE INVENTION

An object of the present invention is to provide a magnetic recording medium excellent in RF output and whose reduced audio output due to the damage of the magnetic tape edges caused by the repetition of running is prevented.

It has now been found that these and other objects of the present invention are attained by a magnetic recording medium comprising a non-magnetic support having thereon at least one magnetic layer comprising a dispersion of ferromagnetic particles in a binder; said at least one magnetic layer comprising:

(a) a surface comprising abrasive agents having a Mohs' hardness of 6 or more in an average amount of 0.3 to 1.4 particles/$\mu m^2$, and (b) a cutting cross section containing abrasive agent having a Mohs' hardness of 6 or more in an average amount of at least 0.1 particle/$\mu m^2$ greater than said average amount of abrasive agents contained on said surface.

More preferably, when the magnetic layer has a double-layer structure comprising a first magnetic layer and a second magnetic layer, and the average amount of said abrasive agents in the cutting cross sections of the first magnetic layer is at least 0.1 particle/$\mu m^2$ greater than that in the cutting cross sections of the second magnetic layer.

DETAILED DESCRIPTION OF THE INVENTION

In a conventional magnetic recording medium, if a large amount of an abrasive agent is added to a magnetic recording medium, the amount of the abrasive agent contained in the cutting cross section of the magnetic tape (i.e., the side-surface of the magnetic tape) and the surface portion of the magnetic tape (i.e., the front-surface of the magnetic tape) are of course increased.

However, there is the problem that an increase in the amount of the abrasive agent added causes a reduction in the packing degree of the magnetic layer and deterioration in electromagnetic property, and these factors must be balanced.

However, the magnetic recording medium of the present invention provides surprisingly good electromagnetic property and running durability, with acceptable still and clogging performance, when the surface portion of the magnetic layer contains the abrasive agent having a Mohs' hardness of 6 or more (preferably 8 or more) in an average amount (density) of 0.3 to 1.4 particles/$\mu m^2$ (preferably 0.5 to 1.0 particles/$\mu m^2$). If the average amount of the abrasive material is less than 0.3 particle/$\mu m^2$, the durability is insufficient, while if the average amount exceeds 1.4 particles/$\mu m^2$, the electromagnetic property is unfavorably deteriorated.

On the other hand, the cutting cross sections of the magnetic layer contain the abrasive agent in an average amount (i.e., the density) higher than that in the surface portion thereof, whereby the tape edge damage caused by the repetition of running is reduced and sufficient running durability is attained. A high-level technique is required for controlling the average amount (i.e., the density) of the abrasive agent in the present invention.

The distribution of the abrasive agent in the magnetic layer is determined until the abrasive agent uniformly dispersed in the magnetic layer is dried after its application. It has been discovered that this varies depending on the difference in affinity between a solvent and the abrasive agent in a coating composition, and on the drying rate.

For example, when the drying is rapidly carried out, namely when an easily evaporable solvent is used, the abrasive agent tends to come up to the surface of the magnetic layer. When the drying is carried out slowly, namely when a solvent difficult to evaporate is used, the abrasive agent tends to go into the magnetic layer. Accordingly, it is preferred in the present invention that the drying is carried out slowly.

When the abrasive agent is formed into a paste by using a binder, it tends to come up to the surface of the magnetic layer in some cases, also depending on the combination of the abrasive agent with a specific binder. For example, when an amino binder, specifically an amino group-containing vinyl chloride resin, is used, the abrasive agent does not come up to the surface of the magnetic layer. However, when a fluorine-containing binder, specifically a fluorine-containing polyurethane, is used, the abrasive agent is liable to come up to the surface of the magnetic layer. Accordingly, in the present invention, when the binder is used in a paste form, a vinyl chloride acetate resin containing an amino group, a sulfonic metal salt group, a carboxyl group or a phosphoric acid group is preferred.

Further, the behavior of the abrasive agent is also influenced by its characteristics. For example, red oxide ($\alpha$-$Fe_2O_3$), which is an abrasive agent liable to come up to the surface of the magnetic layer, more easily comes up to the surface of the magnetic layer when coating the abrasive agent with a binder.

The present invention can be also achieved by forming the magnetic layer having a double-layer structure, and incorporating a larger amount of the abrasive material in a lower layer exposing only the cutting cross sections of the magnetic layer.

The ferromagnetic powder contained in the magnetic layer in the present invention has a particle size (a length in the long axis) of generally not more than 0.30 $\mu$m, preferably not more than 0.20 $\mu$m, more preferably not more than 0.15 $\mu$m, and a length in the long axis/a length in the short axis ratio, namely an acicular ratio, of generally 2 to 20. The term "a length in the long axis" used herein means the longest axis of the three axes of a particle, and the length in the short axis means the shortest axis thereof.

In the case of the double-layer structure, it is preferred that the ferromagnetic powder contained in the second magnetic layer coated on the first magnetic layer is smaller in particle size than that in the first magnetic layer, coated on the support. The ferromagnetic powder has a specific surface area of generally 25 to 80 $m^2/g$, when represented by the specific surface area in accordance with the BET method. In the case of the double-layer structure, it is preferred that the ferromagnetic powder contained in the second magnetic layer is larger in specific surface area than that in the first magnetic layer.

The ferromagnetic powder used in the present invention has a crystallite size of generally 100 to 450 angstroms, preferably 150 to 350 angstroms. In the case of the double-layer structure it is preferred that the ferromagnetic powder contained in the second magnetic layer is smaller in crystallite size than that in the first magnetic layer.

The ferromagnetic powder used in the present invention has a coercive force (Hc) of generally 200 to 1,800 Oe, preferably 500 to 1,000 Oe. In the case of the double-layer structure, it is preferred that the ferromagnetic powder contained in the second magnetic layer is higher in coercive force (Hc) than that in the first magnetic layer.

The ferromagnetic powder used in the present invention has a saturation magnetization ($\sigma_s$) of generally at least 50 emu/g, preferably at least 70 emu/g. When the ferromagnetic powder is a finely divided metal powder, the saturation magnetization is preferably 100 emu/g or more.

When the ferromagnetic powder used in the present invention is formed of cobalt-modified iron oxide, the ratio of divalent iron to trivalent iron is preferably 0 to 20 atomic %, more preferably 5 to 10 atomic %. The amount of iron is 0 to 15 atomic % based on the amount of cobalt, preferably 3 to 8 atomic %.

It is preferred that the pH of the ferromagnetic powder is optimized according to a combination with a binder used. The range of the pH is generally 4 to 12, preferably 6 to 10.

At least one of the ferromagnetic powder in the first magnetic layer and the ferromagnetic powder in the second magnetic layer may be surface-treated with Al, Si, P or salts thereof if desired.

The ferromagnetic powders which can be used in the present invention include conventional ferromagnetic powders such as $\gamma$-$FeO_x$ (x=1.33–1.5); Co-modified $\gamma$-$FeO_x$ (x=1.33–1.5); a finely divided ferromagnetic alloy powder mainly containing (at least 75 atomic %) Fe, Ni or Co; barium ferrite and strontium ferrite. These ferromagnetic powders may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B, in addition to the predetermined elements.

Of the above-described ferromagnetic powders, the finely divided ferromagnetic alloy powders may contain small amounts of hydroxides or oxides. The ferromagnetic alloy powders obtained by known methods can be used, which include the following methods:

(a) A method in which a complex organic acid salt (mainly an oxalic acid salt) is reduced with a reducing gas such as hydrogen;

(b) A method in which iron oxide is reduced with a reducing gas such as hydrogen to obtain Fe or Fe-Co particles;

(c) A method in which a metal carbonyl compound is thermally decomposed;

(d) A method in which a reducing agent such as sodium borohydride, a hypophosphite or hydrazine is added to an aqueous solution of a ferromagnetic metal to conduct reduction; and (e) A method in which a metal is vaporized in a low-pressure inert gas to obtain a fine powder.

The finely divided ferromagnetic alloy powders thus obtained may be subjected to a conventional gradual-oxidizing method such as a method in which the ferromagnetic alloy powders are immersed in an organic solvent, followed by drying, a method in which ferromagnetic alloy powders are immersed in an organic solvent, and then an oxygen-containing gas is introduced therein to form an oxide film, followed by drying, and a method in which the partial pressures of an oxygen gas and an inert gas are controlled to form an oxide film on the surfaces of the particles without using an organic solvent.

It is preferred that the ferromagnetic powder used in the present invention has few pores. The percentage of pores is preferably 20% by volume or less, more preferably 5% by volume or less.

The ferromagnetic powders used in the present invention can be produced by known methods. The shape thereof may be any of acicular, granular, ellipsoidal and plate-like forms, as long as the above-described characteristics for particle size are fulfilled.

In the present invention, known thermoplastic resins, thermosetting resins, reactive resins and mixtures thereof are used in the single magnetic layer or both of the first and second magnetic layers of the double-layer structure as the binders in addition to the specific binder for dispersing the abrasive agent described above.

The thermoplastic resins include resins having a glass transition temperature of $-100°$ to $150°$ C., a number average molecular weight of 1,000 to 200,000, preferably 10,000 to 100,000 and a degree of polymerization of about 50 to 1,000.

Examples of such resins include polymers or copolymers containing vinyl chloride, vinyl acetate, vinyl alcohol, maleic acid, acrylic acid, an acrylic ester, vinylidene chloride, acrylonitrile, methacrylic acid, a methacrylic acid ester, styrene, butadiene, ethylene, vinyl butyral, vinyl acetal and a vinyl ether as a constituent unit; polyurethane resins; and various rubber resins.

Examples of the thermosetting resins or the reactive resins include phenolic resins, epoxy resins, hardenable polyurethane resins, urea resins, melamine resins, alkyd resins, reactive acrylic resins, formaldehyde resins, silicone resins, epoxy-polyamide resins, mixtures of polyester resins and isocyanate prepolymers, mixtures of polyester polyols and polyisocyanates and mixtures of polyurethanes and polyisocyanates. These resins are described in detail in "Plastic Handbook" published by Asakura Shoten, Japan.

It is also possible to use known resins of an electron beam hardening type in the first and second magnetic layers. Examples of these resins and methods for producing them are described in detail in JP-A-62-256219.

The resins described above can be used alone or in combination. Preferred examples include combinations of resins of at least one kind selected from the group consisting of vinyl chloride resins, vinyl chloride-vinyl acetate resins, vinyl chloride-vinyl acetate-vinyl alcohol resins and vinyl chloride-vinyl acetate-maleic anhydride copolymers, with polyurethane resins, and combinations of these combined resins with further polyisocyanate resins.

Conventional polyurethane resins such as polyester-polyurethanes, polyether-polyurethanes, polyether-polyester-polyurethanes, polycarbonatepolyurethanes, polyesterpolycarbonate-polyurethanes or polycaprolactampolyurethanes can be used.

For all of the binders described, in order to obtain more excellent dispersability and durability, it is preferred to introduce therein at least one polar group selected from the group consisting of —COOM, —SO$_3$M, —OSO$_3$M, —P=O(OM)$_2$, —O—P=O(OM)$_2$ (wherein M represents a hydrogen atom or an alkali metal salt group), —OH,

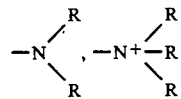

(wherein R represents a hydrocarbon group), an epoxy group, —SH and —CN, using a copolymerization reaction or an addition reaction.

The content of such a polar group is $1\times10^{-1}$ to $1\times10^{-8}$ mol/g, preferably $1\times10^{-2}$ to $1\times10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE (which are manufactured by Union Carbide Co., Ltd.); MPR-TA, MPR-TA5, MPR-TAL, MPR-TSN, MPR-TMF, MPR-TS and MPR-TM (which are manufactured by Nissin Chemical Industry Co., Ltd.); 1000W, DX80, DX81, DX82 and DX 83 (which are manufactured by Denki Kagaku Co., Ltd.); MR110, MR100 and 400X110A (which are manufactured by Nippon Zeon Co., Ltd.); Nippollan N2301, N2302 and N2303 (which are manufactured by Nippon Polyurethane Co., Ltd.); Pandex T-5105, T-R3080 and T-5201, Barnock D-400 and D-210-80, and Crisvon 6109 and Crisvon 7209 (which are manufactured by Dainippon Ink and Chemicals, Inc.); Vylon R8200, UR8300, RV530 and RV280 manufactured by Toyobo Co., Ltd.; Daipheramin 4020, 5020, 5100, 5300, 9020, 9022 and 7020 which are manufactured by Dainichiseika Co., Ltd.; MX5004 manufactured by Mitsubishi Chemical Corporation; Sunprene SP-150 manufactured by Sanyo Chemical Industries Co., Ltd.; and Salan F310 and F210 manufactured by Asahi Chemical Industry Co., Ltd.

When the binder is used in the single magnetic layer or in the first and second magnetic layers of the double-layer constitution in the present invention, the binder is used in an amount of 5 to 50% by weight, preferably 10 to 30% by weight based on the ferromagnetic powder contained in each magnetic layer. When a vinyl chloride resin is used, it is preferably used in an amount of 5 to 30% by weight, and when a polyurethane resin is used, it is preferably used in an amount of 2 to 20% by weight. It is preferred the polyisocyanate is used in an amount of 2 to 20% by weight in combination with these resins.

When the polyurethane resins are used in the present invention, there are preferably used polyurethane resins having a glass transition temperature of $-50°$ to $100°$ C., a breaking elongation of 100 to 2,000%, a breaking stress of 0.05 to 10 kg/cm$^2$ and a yield point of 0.05 to 10 kg/cm$^2$.

Examples of the polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; the reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.); Takenate D-102, Takenate D-110N, Takenate D-200 and Takenate D-202 (manufactured by Takeda Chemical Industries Co., Ltd.); and Desmodule L, Desmodule IL, Desmodule N and Desmodule HL (manufactured by Sumitomo Bayer Co., Ltd.).

In the present invention, carbon black can be used. Examples thereof include furnace for rubbers, thermal for rubbers, black for coloring and acetylene black. It is preferred that the carbon black has a specific surface area ($S_{BET}$) of 5 to 500 m$^2$/g, an oil adsorption as measured by the DBP method of 10 to 400 ml/100 g, a particle size of 5 to 300 m$\mu$, a pH of 2 to 10, a water content of 0.1 to 10 wt. % and a tap density of 0.1 to 1 g/ml.

Specific examples of the carbon black used in the present invention include BLACKPEARLS 2000, 1300, 1000, 900, 800 and 700, and VULCAN XC-72 (manufactured by Cabot Co., Ltd.); #80, #60, #55, #50 and #35 (manufactured by Asahi Carbon Co., Ltd.); #2400B, #2300, #900, #1,000, #30, #40 and #10B (manufactured by Mitsubishi Chemical Corporation); and CONDUCTEX SC, Raven 150, 50, 40 and 15 (manufactured by Colombia Carbon Co., Ltd.). Carbon black which is surface treated with a dispersing agent, which is grafted with a resin, or whose surface is partly graphitized can be used. Further, the carbon black may be previously dispersed with a binder before the carbon black is added to the magnetic coating composition.

The carbon black can be used alone or in a combination of two or more in both the first and second magnetic layers. The carbon black is preferably used in an amount of 0.1 to 30% by weight based on the ferromagnetic powder in each of the first and second magnetic layers.

The carbon black serves to provide antistatic property to the magnetic layer, to reduce the coefficient of friction, to give shading property and to increase film strength. These functions vary according to the kind of the carbon black used. It is therefore possible, of course, that the carbon black is properly used in the first and second magnetic layers by changing the kind, amount and combination of the carbon black, based on various characteristics described above such as particle size, oil absorption amount, electric conductivity and pH, according to purpose. For example, carbon black having a high electric conductivity can be incorporated in the first magnetic layer to prevent electrification property, and carbon black having a large particle size can be incorporated in the second layer to reduce the coefficient of friction.

The carbon black which can be used in the present invention is described in *Carbon Black Binran* edited by Carbon Black Association.

Examples of abrasive agents which can be used in the present invention include known materials having a Mohs' hardness of at least 6 such as $\alpha$-alumina having $\alpha$-conversion of 90% or more, $\beta$-alumina, silicon carbide, chromium oxide, cerium oxide, $\alpha$-iron oxide, corundum, artificial diamond, silicon nitride, silicon carbide, titanium carbide, titanium oxide, silicon dioxide and boron nitride. These are used alone or in combination. Composite materials (obtained by surface treatment of abrasive agents with other abrasive agents) composed of these abrasive agents may also be used. Among these, $\alpha$-alumina asnd chromium oxide are preferably used. In some cases, these abrasive agents may contain some compounds or elements other than the main components. However, the effect is unchanged as long as the main components are contained in an amount of 90% or more.

These abrasive agents have a particle size of preferably 0.01 to 2 $\mu$m, more preferably 0.1 to 1 $\mu$m. However, abrasive agents different in particle size may be combined with one another if desired, or the particle size distribution of a single abrasive agent may be widened to obtain a similar effect. It is preferred that the abrasive agents have a tap density (i.e., a density measured when the agents are charged by tapping) of 0.3 to 2 g/ml, a water content of 0.1 to 5%, a pH of 2 to 11 and a specific surface area of 1 to 30 m$^2$/g.

The shape of the abrasive agents used in the present invention may be any of acicular, spherical and die-like forms, but a shape having an edge is preferred because of high abrasive ability.

Specific examples of the abrasive agents used in the present invention include AKP-20, AKP-30, AKP-50 and HIT-50 manufactured by Sumitomo Chemical Co., Ltd.; G5, G7 and S-1 manufactured by Nippon Chemical Industrial Co., Ltd.; and 100ED and 140ED manufactured by Toda Kogyo Co., Ltd.

In the present invention, the distribution of the abrasive agents is controlled by combination of the kinds of the abrasive agents, solvent compositions, drying conditions and times when the abrasive materials are added.

The abrasive agents may be previously dispersed with a binder to form a paste, followed by dispersion together with the magnetic powders.

In the case of the double-layer constitution, it is preferred that the amount, based on the ferromagnetic powder, of the abrasive agent added to the first magnetic layer is larger than that of the abrasive agent added to the second magnetic layer to obtain the magnetic recording medium of the present invention.

In the present invention, additives having lubricating effect, antistatic effect, dispersing effect, plasticizing effect or the like may be added to the magnetic layers.

Examples of such additives include molybdenum disulfide, tungsten disulfide, graphite, boron nitride, fluorinated graphite, silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

In addition, there can be also used nonionic surface active agents such as alkylene oxides, glycerin compounds, glycidol compounds and alkylphenol-ethylene oxide adducts; cationic surface active agents such as cyclic amines, ester amides, quaternary ammonium salts, hydantoin derivatives, heterocyclic compounds, phosphonium compounds and sulfonium compounds; anionic surface active agents containing acidic groups such as carboxylic acid groups, sulfonic acid groups, phosphoric acid groups, sulfate groups and phosphate groups; and amphoteric surface active agents such as amino acids, aminosulfonic acids and sulfates or phosphates of aminoalcohols or alkylbetaines. These surface active agents are described in detail in *Surface Active Agents Binran* (published by Sangyo Tosho Co., Ltd., Japan).

These lubricants and antistatic agents do not necessarily have a purity of 100%, and may further contain impurities such as isomers, unreacted products, by-products, decomposed products and oxidation products other than the main components. The content of these impurities contained in the lubricants and antistatic agents is preferably 30% or less, more preferably 10% or less.

Examples of organic solvents used in the present invention include ketones such as acetone, methyl ethyl ketone, methyl isobutyl ketone, diisobutyl ketone, isophorone, cyclohexanone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These solvents may be used in any proportions.

These organic solvents do not necessarily have a purity of 100%, and may further contain impurities such as isomers, unreacted products, by-products, decomposed products, oxidation products and water other than the main components. The content of these impurities contained in the solvents is preferably 30% by weight or less, more preferably 10% by weight or less.

In the case of the double-layer constitution, the kinds and amounts of the organic solvent used for the first magnetic layer may be different from those used for the second magnetic layer. For example, the highly volatile solvent is used for the first magnetic layer to improve surface properties, the solvent having high surface tension (such as cyclohexanone or dioxane) can be used for the first magnetic layer to improve coating stability, or the solvent having a high solubility parameter can be used for the second magnetic layer to increase the packing density. The use of the solvents is of course not limited to these examples.

In the magnetic recording medium of the present invention, the thickness of the non-magnetic support is generally 1 to 100 $\mu$m, preferably 6 to 20 $\mu$m, and the thickness of the magnetic layer is generally 0.5 to 10 $\mu$m, preferably 1 to 5 $\mu$m. In the case of the double-layer constitution, the thickness of the second magnetic layer is generally not more than 1.5 $\mu$m, preferably not more than 1.0 $\mu$m, more preferably not more than 0.5 $\mu$m. The thickness of the magnetic layer is generally in the range of one hundredth to 2 times that of the non-magnetic support.

Between the non-magnetic support and the first magnetic layer may be formed an interlayer such as an undercoating layer for improvement of adhesion or an antistatic layer containing carbon black for prevention of electrification. The thickness of the interlayer is generally 0.01 to 2 $\mu$m, preferably 0.05 to 0.5 $\mu$m. A backing layer may be provided on the opposite surface of the non-magnetic support. The thickness of the backing layer is generally 0.1 to 2 $\mu$m, preferably 0.3 to 1.0 $\mu$m. As the interlayer and the backing layer, known ones can be used.

Examples of the non-magnetic supports used in the present invention include known films formed by materials such as polyesters (e.g., polylene terephthalate and polyethylene naphthalate, polyolefins, cellulose triacetate, polycarbonate, polyamide, polyimide, polyamideimide or polysulfone. These supports may previously be subjected to corona discharge treatment, plasma treatment, adhesion treatment, heating treatment, dust removing treatment or the like. In order to attain the object of the present invention, there is used the non-magnetic support having a center line average surface roughness ($R_a$) at a cut off value of 0.25 mm of generally not more than 0.03 $\mu$m, preferably not more than 0.02 $\mu$m, more preferably not more than 0.01 $\mu$m. It is further preferred that the non-magnetic support has a small center line average surface roughness and also has no large projections of 1 $\mu$m or more. The roughness and shape of the surface of the support can be controlled by adjusting the size and amount of a filler added thereto, if desired. Examples of the fillers include finely divided organic particles such as acrylic resins, in addition to oxides and carbonates of Ca, Si, Ti and the like.

The F-5 (i.e., the load at the 5% elongation) value of the non-magnetic support used in the present invention in the tape-running direction is preferably 5 to 50 kg/mm$^2$, and the F-5 value in the width direction of the tape is preferably 3 to 30 kg/mm$^2$. In general, the F-5 value in the tape-running direction is generally higher than that in the width direction of the tape. However, if desired, the strength in the tape-width direction may be larger than that in the tape-running direction.

The breaking strength in both directions of the tape is preferably 5 to 100 kg/mm$^2$, and the modulus of elasticity is preferably 100 to 2,000 kg/mm$^2$.

The production process of the magnetic coating composition used for the magnetic recording medium of the present invention comprises at least a kneading step, a dispersing step and mixing steps which is positioned before or after these steps, if desired.

In order to attain the object of the present invention, production techniques known in the art can be used as a part of the process, of course. In the kneading step, however, kneaders having strong kneading ability such as continuous kneaders and pressure kneaders can also be used.

The details of the kneading treatment are described in JP-A-1-106338 and JP-A-1-79274. When the double-layer constitution is used in the magnetic recording medium of the present invention, the thickness of the second magnetic layer is preferably 1.5 $\mu$m or less. It is however substantially difficult to realize such a thickness by the conventional successive coating method in which the first magnetic layer is formed and then the second magnetic layer is formed thereon after drying, because of production of coating defects. In the present invention, the second magnetic layer having a thickness of 1.5 μm or less can be preferably obtained using the simultaneous coating method as described in JP-A-62-212933.

According to the magnetic recording medium of the present invention, the amounts of the abrasive agent contained in the surface portion of the magnetic layer and in the cutting cross sections of the magnetic layer are controlled so that the abrasive agent exists in the cutting cross sections (i.e., the side-surface of the magnetic tape) of the magnetic layer in an average amount (i.e., the average density) of at least 0.1 particle/μm² greater than that in the surface portion of the magnetic layer, whereby the reduced audio output can be prevented while keeping excellent RF output.

In order to prevent the reduced audio output, it is necessary to reinforce the cutting cross sections (i.e., the side-surface of the magnetic tape) of the magnetic layer, and therefore the edges of the tape is required to contain a sufficient amount of the abrasive agent.

Conventional techniques have the problem that the amount of the abrasive agent contained in the surface portion is also increased to decrease the packing density and the surface properties, which causes a reduction in RF output. However, the present invention simultaneously satisfies both the packing density and the surface properties by controlling the amounts of the abrasive agent contained in the surface portion of the magnetic layer and in the cutting cross sections of the magnetic layer.

The present invention is now described in greater detail with reference to the following Examples and Comparative Examples, but the present invention is not to be construed as being limited thereto. Unless otherwise indicated, all parts, percents and ratios are by weight.

EXAMPLES

| First Magnetic Layer | |
|---|---|
| Cobalt-modified iron oxide (Hc: 600 Oe, specific surface area: 30 m²/g, crystallite size: 400 angstroms, particle size (length in the long axis): 0.25 μm, acicular ratio: 10) | 100 parts |
| Vinyl chloride-vinyl acetate-maleic acid anhydride copolymer (composition weight ratio: 86:13:1, degree of polymerization: 400) | 10 parts |
| Polyester polyurethane resin (molecular weight: 50,000) | 5 parts |
| Carbon black (particle size: 0.05 μm) | 3 parts |
| α-Alumina (particle size: 0.3 μm) | 10 parts |
| Butyl stearate | 1 parts |
| Stearic acid | 2 parts |
| Butyl acetate | 200 parts |
| Second Magnetic Layer | |
| Cobalt-modified iron oxide (Hc: 700 Oe, specific surface area: 35 m²/g, crystallite size: 350 angstroms, particle size (length in the long axis): 0.20 μm, acicular ratio: 12) | 100 parts |
| Vinyl chloride-vinyl acetate-maleic acid anhydride copolymer (composition weight ratio: 86:13:1, degree of polymerization: 400) | 12 parts |
| Polyester polyurethane resin (carboxyl group content: $10^{-4}$ mol/g, molecular weight: 30,000) | 6 parts |
| α-Alumina (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |

COMPARATIVE EXAMPLE 1

With respect to the second magnetic layer of the above compositions, the components were kneaded with a kneader, and then dispersed by using a sand mill. Six parts of polyisocyanate was added to the resulting dispersion solution, and 40 parts of butyl acetate was further added thereto, followed by filtration by using a filter having an average pore size of 1 μm to prepare a coating composition.

The resulting coating composition was applied to a 15 μm thick polyethylene terephthalate support having a center line average surface roughness ($R_a$) of 0.01 μm by reverse roll coating so as to form a magnetic layer having a thickness of 4.0 μm after drying. Then, orientation was conducted in a wet condition by a cobalt magnet having a magnetic force of 3,000 G and a solenoid having a magnetic force of 1,500 G. After drying, surface smoothening treatment was conducted by a 7-stage calendering at 90° C., followed by slitting to a width of ½ inch to produce a video tape. The properties of the tape thus obtained are shown in Table 1.

COMPARATIVE EXAMPLE 2

A video tape was prepared in the same manner as in Comparative Example 1 except that α-alumina is used in an amount of 6 parts. The results are shown in Table 1.

EXAMPLE 1

A video tape was prepared in the same manner as in Comparative Example 2 except that the drying temperature was 60° C. The results are shown in Table 1.

COMPARATIVE EXAMPLE 3

A video tape was prepared in the same manner as in Comparative Example 2 except that the drying temperature was 100° C. The results are shown in Table 1.

EXAMPLES 2 TO 4 AND 9

Video tapes were prepared in the same manner as in Comparative Example 2 except that toluene, a butyl acetate-cyclohexanone mixture (70/30), a butyl acetate-cyclohexanone (50/50) and a butyl acetate-cyclohexanone mixture (30/70) were used, respectively. The results are shown in Table 1.

EXAMPLE 5

After the magnetic coating composition for the first magnetic layer as described above was applied, the coating for the second magnetic layer was applied thereto by the simultaneous double coating method before the first magnetic layer was dried, followed by drying to produce a tape. The first and second magnetic layers were 3.0 μm and 1.0 μm in thickness, respectively, after drying. The results are shown in Table 1.

COMPARATIVE EXAMPLE 5

A video tape was prepared in the same manner as in Comparative Example 2 except that chromium dioxide having a particle size of 0.3 μm was used in place of α-alumina. The results are shown in Table 1.

EXAMPLES 6 AND 7

Video tapes were prepared in the same manner as in Examples 4 and 9, respectively, except that chromium dioxide was used in place of α-alumina. The results are shown in Table 1.

EXAMPLE 8

A video tape was prepared in the same manner as in Example 5 except that chromium dioxide was used in place of α-alumina. The results are shown in Table 1.

COMPARATIVE EXAMPLE 6

A video tape was prepared in the same manner as in Example 1 except that α-alumina is used in an amount of 10 parts. The results are shown in Table 1.

COMPARATIVE EXAMPLE 7

A video tape was prepared in the same manner as in Comparative Example 2 except that the drying temperature was 70° C. The results are shown in Table 1.

EVALUATION METHODS

RF Output

A video signal of image signal 50IRE was recorded by standard picture recording current. The mean value of the envelope of this reproduced RF output was measured with an oscilloscope, and the RF output was calculated from the following equation:

$$RF \text{ output } (dB) = 20 \log_{10} V/V_0$$

wherein V represents the mean value and $V_0$ represents a standard value.

Reduced Audio Output

Five rolls of tape 120 minutes in playing time were run 100 passes in a video deck AG6200 manufactured by Matsushita Electric Industrial Co., Ltd., and the reduction amount in 1 kHz audio output was determined as a mean value.

Amounts of Abrasive Material in Surface Portion of Magnetic Layer and Cutting Cross Sections of the Magnetic Layer Photographs of the surface portion of the magnetic layer and the cross sections thereof were taken at X10,000 magnification with a scanning-type electron microscope, and the amounts of the abrasive material existing in an area of 30 μm² were visually examined.

Five measurements were averaged. In the case of the cross sections of the magnetic layer, five values measured at equal intervals in the direction of thickness were averaged.

TABLE 1

| No. | Kind of Abrasive Agent First Layer | Kind of Abrasive Agent Second Layer | Amount of Abrasive Agent First Layer (part) | Amount of Abrasive Agent Second Layer (part) | Solvent |
| --- | --- | --- | --- | --- | --- |
| Comparative Example | | | | | |
| 1 | α-Alumina | — | 3 | — | Butyl acetate |
| 2 | α-Alumina | — | 6 | — | Butyl acetate |
| Example 1 | α-Alumina | — | 6 | — | Butyl acetate |
| Comparative Example 3 | α-Alumina | — | 6 | — | Butyl acetate |
| 4 | α-Alumina | — | 6 | — | Methyl ethyl ketone |
| Example 2 | α-Alumina | — | 6 | — | Toluene |
| 3 | α-Alumina | — | 6 | — | Butyl acetate/ cyclohexanone 70/30 |
| 4 | α-Alumina | — | 6 | — | Butyl acetate/ cyclohexanone 50/50 |
| 5 | α-Alumina | α-Alumina | 3 | 10 | Butyl acetate |
| Comparative Example 5 | Chromium dioxide | — | 6 | — | Butyl acetate |
| Example 6 | Chromium dioxide | — | 6 | — | Butyl acetate/ 70/30 |
| Example 7 | Chromium dioxide | — | 6 | — | Butyl acetate/ cyclohexanone 50/50 |
| Example 8 | Chromium dioxide | Chromium dioxide | 3 | 10 | Butyl acetate |
| 9 | α-Alumina | — | 6 | — | Butyl acetate/ cyclohexanone 30/70 |
| Comparative Example 6 | α-Alumina | — | 10 | — | Butyl acetate |

TABLE 1-continued

| | | | | | |
|---|---|---|---|---|---|
| 7 | α-Alumina | — | 6 | — | Butyl acetate |

| No. | Drying Temperature (°C.) | Amount of Abrasive Agent at Surface (particle/$\mu m^2$) | Amount of Abrasive Agent at Cross Section (particle/$\mu m^2$) | Reduced Audio Output (dB) | RF Output (dB) |
|---|---|---|---|---|---|
| Comparative Example 1 | 80 | 0.9 | 0.50 | −14 | 0.9 |
| 2 | 80 | 1.2 | 1.00 | −2 | 0.0 |
| Example 1 | 60 | 0.9 | 1.00 | −2 | 1.0 |
| Comparative Example 3 | 100 | 1.5 | 1.00 | −2 | −1.1 |
| 4 | 80 | 1.5 | 1.00 | −2 | −1.2 |
| Example 2 | 80 | 0.9 | 1.00 | −2 | 1.0 |
| 3 | 80 | 0.9 | 1.00 | −2 | 1.1 |
| 4 | 80 | 0.6 | 1.00 | −2 | 1.5 |
| 5 | 80 | 0.9 | 1.38 | 0 | 1.0 |
| Comparative Example 5 | 80 | 1.2 | 1.00 | −2 | −0.1 |
| Example 6 | 80 | 0.9 | 1.00 | −2 | 0.9 |
| 7 | 80 | 0.6 | 1.00 | −2 | 1.4 |
| 8 | 80 | 0.9 | 1.38 | 0 | 1.0 |
| 9 | 80 | 0.4 | 1.00 | −2 | 1.8 |
| Comparative Example 6 | 60 | 1.5 | 1.70 | 0 | −0.8 |
| 7 | 70 | 1.0 | 1.00 | −2 | 0.5 |

As is apparent from the results shown in Table 1, the samples of Examples 1 to 9 satisfying the requirements of the present invention exhibited satisfactory reduced audio output of −2 dB or less, and simultaneously had a good RF output of at least 0.9 dB.

In contrast, for the samples of Comparative Examples 1 to 7, the reduced audio output was as large as −14 dB (Comparative Example 1), or the RF output was 0.5 dB or less (Comparative Examples 2 to 7). No comparative samples simultaneously satisfied both the reduced audio output and the RF output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least one magnetic layer comprising a dispersion of ferromagnetic particles in a binder; said at least one magnetic layer comprising:

(a) a surface comprising abrasive agents having a Mohs' hardness of 6 or more in an average amount of 0.3 to 1.4 particles/$\mu m^2$, and
   (b) a cutting cross section containing abrasive agents having a Mohs' hardness of 6 or more in an average amount of at least 0.1 particle/$\mu m^2$ greater than said average amount of abrasive agents contained on said surface.

2. The magnetic recording medium as claimed in claim 1, wherein said magnetic layer has a double-layer structure comprising a first magnetic layer and a second magnetic layer, and the average amount of said abrasive agents in the cutting cross sections of the first magnetic layer is at least 0.1 particle/$\mu m^2$ greater than that in the cutting cross sections of the second magnetic layer.

3. The magnetic recording medium as claimed in claim 1, wherein said abrasive agents have an average particle size of 0.01 to 2 $\mu m$; a tap density of 0.3 to 2 g/ml; a water content of 0.1 to 5%; a pH of 2 to 11; and a specific surface area of 1 to 30 $m^2/g$.

* * * * *